April 21, 1970 B. M. GORDON 3,508,249
DIGITAL-TO-ANALOG CONVERTER
Filed April 4, 1966
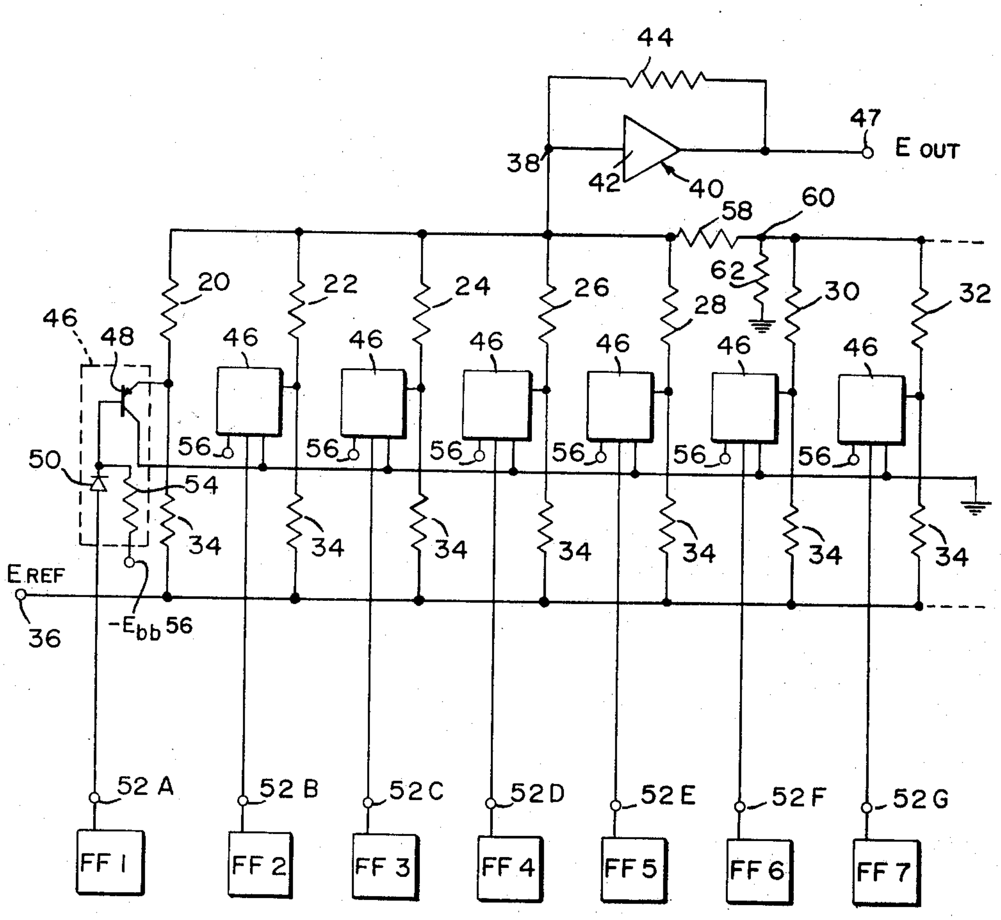
INVENTOR
BERNARD M. GORDON
BY
Robert J. Schiller
ATTORNEY United States Patent Office 3,508,249
Patented Apr. 21, 1970

3,508,249

DIGITAL-TO-ANALOG CONVERTER

Bernard M. Gordon, Magnolia, Mass., assignor to Gordon Engineering Company, Waltham, Mass., a limited partnership of Massachusetts Filed Apr. 4, 1966, Ser. No. 540,012
Int. Cl. H03k 13/04
U.S. Cl. 340—347 7 Claims

ABSTRACT OF THE DISCLOSURE

In a successive approximation device for converting digital data to analog form, a diode-transistor combination is provided for unipolar switching of a bipolar reference voltage with respect to a resistive divider network in order to afford an inexpensive and compact converter.

This invention relates to electronic devices and more particularly to a digital-to-analog converter.

Many devices, particularly in the computer field, require that digital information be converted to an analog signal. Typically, this is accomplished by using a resistive divider network connected to the outputs of a register which contains a digital number. The resistances in the network are weighted so that each digit in the register will contribute to the output signal proportionately to the numerical value of the digit.

The signal levels representing the digital number are generally insufficiently precise to be converted directly to the analog signal. For higher accuracy, a known technique is to use the digital signals to control means for switching the divider network between two precisely determined voltage levels, to sum the currents in the network at the input of a stabilized operational amplifier.

Heretofore, switching has been accomplished with double-pole type switches, but this has not been completely satisfactory. For example, assuming that the current contribution to the summing junction of an operational amplifier due to the most significant digit is 1 ma., the next most significant digit will provide 0.5 ma., and the $n$th significant digit then will provide $\frac{1}{2}^{n-1}$ ma. If the voltage levels switched are ground and about 10 volts, the ladder resistances will be, for a typical five binary digit input ladder, from 10KΩ to 160 KΩ. A two-pole switch cannot switch a 160KΩ load quickly because of the large time constant involved.

Further, in cases where one wishes to use a time-varying oscillatory reference voltage, the two-pole switching technique requires a switch for each polarity of reference voltage, and the switching network becomes cumbersome and expensive.

A principal object of the present invention is to provide digital-to-analog conversion means which employs unipolar switching, to obviate the problems set forth above.

Other objects of the present invention are to provide digital to analog conversion means wherein the switching means controlled by each digital signal is a single diode-transistor combination; to provide conversion means of the type described in which the transistor is in inverted configuration and is operable as a shunt switch.

Other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawing wherein there is shown a schematic circuit diagram of a digital-to-analog converter, partly in block form, embodying the principals of the present invention.

As shown in the drawing, the circuit includes a plurality of resistive impedances, 20, 22, 24, 28, 30 and 32, of weighted ohmic values as will appear hereinafter. Each of the resistive impedances is connected in a series to a corresponding one of a like plurality of resistors, 34, all of the latter being preferably of the same value. The series pairs of resistors are connected in parallel with one another between a common line connected to reference terminal 36, and summing junction 38 at the input of operational amplifier 40. The latter includes high-gain, inverting amplification stage 42 having a feedback loop containing series resistor 44 between output terminal 47 of stage 40 and summing junction 38.

Means are provided for switching each series resistor pair between a first voltage or ground, and a reference voltage. Thus, terminal 36 is intended to be connected to a source of reference voltage, $E_{REF}$. Connected to each junction of the resistors of each series pair is switching means, identified generally by the reference numeral 46, but shown in detail as exemplary of all, by the switching means associated with the series pair of resistors 20 and 34.

As illustrated, switching means 46 comprises a three-terminal transistor 48 having its emitter connected to the junction of the resistors of a series pair such as resistors 20 and 34. The collector of transistor 48 is connected to ground, and the transistor base is connected to one terminal of an associated unilateral current conductive device or diode 50. The other terminal of diode 50 is connected to a digital input terminal 52A.

In the form shown, transistor 48 is a pnp type, preferably a chopper transistor having characteristics similar to type 2N392. Thus, diode 50 is shown poled so that its cathode is connected to the base of transistor 48 and its anode to terminal 52A. Transistor 48 is provided with a current source comprising resistor 54 connected between the base of transistor 48 and terminal 56 at which a voltage, $E_{bb}$, is intended to be applied. Each of the other switching means 46 is similarly connected to a corresponding one of a number of other digital input terminals 52B, 52C, 52D, 52E, 52F, and 52G.

For purposes of describing the operation of the circuit, it can be assumed that each of the digital input terminals 52A . . . 52G is coupled to, for example, the assertion output terminal of one of corresponding bistable devices or flip-flops FF1 . . . FF7. It will be understood that the flip-flops are merely representative of stages in a digital register, or some other digital device, and the number of flip-flops shown, as well as the number of series pairs of resistors and associated switches, is to be considered only as exemplary. It can further be assumed that the most significant digital signal will appear on the output of flip-flop FF1, the next lesser significant digit at the output of flip-flop FF2, and so one. Typical numerical values can be employed to aid in understanding the operation of the device, and thus resistors 34 are all of the same value, $R_1$, for example 10KΩ. Resistor 20, associated with the most significant digit has a value of $R-R_1$, R typically being 20KΩ. Resistor 22 then has a value of $2R-R_1$; resistor 24, a value of $4R-R_1$; resistor 26, a value of $8R-R_1$; and resistor 28, a value of $16R-R_1$.

As initial conditions, one can assume that $E_{REF}$ is 10 volts and the voltage level delivered at each digital input terminal 52A . . . 52G is a step change between, for example, a "down" state of −1 volt and an "up" state of +6 volts, equivalent to binary *zero* and binary *one* respectively. Voltage $E_{bb}$ is −15 volts and resistor 54 is 30KΩ.

Now if flip-flop FF1 is in its zero state, diode 50 will be back-biased and not conducting because the base of transistor is at about −0.7 volt and the diode anode is more negative. Thus, transistor 48 is conducting a 0.5 ma. current through the base-collector junction to ground. This conduction tends to pull the emitter voltage toward ground, dumping or shunting current through resistor 34. No current will, therefore, flow into summing junction 38.

If $E_{REF}$ is negative, and the anode of diode 50 is now brought up beyond about +0.7 volt, as by a change in the input of flip-flop FF1 to its "on" state, the diode will become forward-biased, and will conduct, pulling the base of the transistor toward ground. This serves to back-bias the transistor which ceases conduction in its collector-emitter circuit. The transistor emitter therefore rises to about −5 volts, and a current flows between summing junction 38 and reference terminal 36 through the series sum of resistors 20 and 34. For the exemplary values given, this current will be 0.5 ma.

On the other hand, if $E_{REF}$ is positive, then the emitter would sit at +5 volts when transistor 48 is open or non-conducting. Thus, to open the switch, more than +5.7 volts must be applied at the base of the transistor, and this level is readily supplied by the +6 volts provided by the flip-flop in its "up" state.

In summary then, regardless of the polarity of the reference voltage $E_{REF}$, transistor 48 and diode 50 operate to provide a switching action which, when the flip-flop output is "up," allows current to flow through the series-resistor pair, and when the flip-flop output goes "down," diverts or shunts current so that substantially none flows into summing junction 38.

For precise resistors, the error when the switch is open, will be the leakage current in the switch times the resistance 10K (i.e. about $0.2 \times 10^{-9} \times 10^{-4}$), and the percentage error of the series resistor which can easily be kept to 0.015% maximum. When the switch is closed the current will only be the offset voltage in the switch divided by the resistance of the series pair which will be less than .005% of full scale.

In like manner, each other switching means 46, when "off" according to the "down" state of its controlling flip-flop, will allow one-half as much current to be passed through summing junction 38 as will the switch controlled by the flip-flop representing the next more significant digit. Of course, the error contribution by each successive switching stage (and its associated resistors) will be reduced by a factor of two because of the doubling of resistance in each successive series pair.

If feedback resistor 44 is set at a value of $R/2$ or 5KΩ (which is the limiting sum of a plurality of parallel resistances of value $2^{(n-1)}R$), then as well known, the output $E_o$ of amplifier 40 will be the voltage drop across the feedback resistor due to the sum of current into summing junction 38.

If the total digital converter ladder is represented by resistors 20 . . . 28 and associated resistors 34, then full scale voltage $E_{out}$ would represent the binary number 11111 (decimal 31) on flip-flop FF1 . . . FF5 and would be the sum of the currents into the summing junction times the value of feedback resistor 44, or about 4.844 volts. The least significant current due to a flip-flop state of 00001 would be 0.031 ma. or an $E_{out}$ of about .156 volt or $\frac{1}{31}$ of full scale.

Where it is desired to extend the number of resistive pairs in the ladder to accommodate an input of more digits, for example another or second group of five successively lesser significant digits, it will be appreciated that, because the sum of each series pair of resistors in the ladder increases successively in value according to $2^{(n-1)}R$, the resistances become very large and difficult to handle.

However, the second group of series resistive pairs of which resistors 30 and 34 and resistors 32 and 34 are shown as exemplary pairs, can be weighted so that resistors 30 and 32 have the same values respectively as resistors 20 and 22, i.e. $R-R_1$ and $2R-R_1$. In other words, the ladder resistances of the second group are the same as the ladder resistances of the first group. To insure that the current contribution from the second group is appropriately scaled, the circuit includes resistor 58 connected in series between summing junction 38 and the common connection 60 of resistors 30 and 32. A second resistor 62 is connected between common connection 60 and ground. Resistor 62 is selected to have a very low value compared to the value of R, e.g. 100Ω, and hence serves to shunt to ground current from the second group of ladder resistances. Resistor 62 then acts as a voltage source for resistor 58. The voltage developed across resistor 60 drives a current through resistor 58, the latter being very large in value compared to resistor 62. The values of resistors 58 and 62 are in a ratio such that the current contribution from the second group of ladder resistances is scaled proportionately to the current contribution from the first group.

For example, it will be seen that resistor pair 30 and 34 have values respectively of $R-R_1$ and $R_1$. Thus, the current I6 into connection 60 due to switch means 46 (associated with this resistive pair) being open will be the same magnitude as the current originating through resistors 20 and 24. However, the switching of resistors 30 and 34 is controlled by FF6 which has a binary weight of 000001 or decimal $\frac{1}{64}$. Hence, resistors 58 and 62 are selected such that the voltage drop across resistor 62 then drives only $\frac{1}{64}$ I6 into summing junction 38. Obviously, the current contribution at connection 60 due to switching of resistive pair 32 and 34 is then $\frac{1}{2} \times \frac{1}{64}$ I6 ad so on. Extension of the ladder to any number of resistive pairs can be thus achieved without employing resistors of prohibitively large magnitude.

It will be understood that the circuit disclosed has been described in terms of pnp transistors but in accordance with the principle of transistor duality, npn transistors can as readily be employed with the usual modifications of polarities of other elements. While the description has been to groups of five parallel ladder resistances, the invention is not so limited and the number of resistances in each group is a matter of choice.

Since these and other changes may be made in the above apparatus without departing from the scope of the invention herein involved, it is intended that all matter contained in the above description or shown in the accompanying drawing shall be interpreted in an illustrative and not in a limiting sense.

What is claimed is:

1. Apparatus for converting digital-to-analog signals and comprising in combination: a first plurality of pairs of series resistors, said pairs being connected in parallel between a summing junction at the input of an operational amplifier and a terminal adapted to have a reference voltage applied thereto; a like plurality of diode-transistor switching means each for connecting and disconnecting the junction of a corresponding pair of said series resistors to apparatus ground responsively to a respective digit of said digital signal; and terminal means for receiving a reference signal of selected polarity, said selected polarity being positive or negative, said diode-transistor switching means having a like effect irrespective of said selected polarity, the first resistors of said pairs being connected to said summing junction, each having a resistive value weighted according to the numerical code of said digital signal and the second resistors of said pairs being of substantially the same value as one another, each of said diode-transistor switching means comprising a three-terminal transistor having its control terminal connected to one terminal of unilateral current-conductive means, the other terminal of the latter being connected to an input terminal adapted to have a respective digit of said digital signal applied thereto, the other terminals of said transistor respectively being connected to said ground and to said junction of said corresponding pair of resistors.

2. Apparatus as defined in claim 1 wherein said numerical code is binary and said operational amplifier has a feedback resistor in series between its output and a summing junction at its input, said feedback resistor having a resistive value of $R/2$: said second resistors having a resistive value of $R^1$, and; said first resistors having respective weighted resistive values of $$(2^{n-1})R-R^1$$

where $n$ is the significance of the respective digit to which said diode-transistor switching means associated with each such second resistor is responsive.

3. Apparatus as defined in claim 1, at least another plurality of pairs of series resistors and another plurality of associated diode-transistor switching means being connected to one another and being weighted in similar manner to said first plurality, and impedance means for connecting a common junction of the first resistors of said other plurality of said summing junction whereby the current contribution at said summing junction due to said second plurality is proportioned according to the numerical significance of the digits of said digital signals to which said diode-transistor switching means of said second plurality of responsive.

4. Apparatus as defined in claim 3 wherein said impedance means comprises a first element of low resistance compared to the least value of resistance of the resistors of the series pairs, said first element being connected between said common junction and said ground, and a second element of greater resistance compared to said first element, said second element being connected between said common junction and said summing junction; said first element constituting a voltage source for driving a current through said second element.

5. Apparatus for converting digital-to-analog signals and comprising in combination: a first plurality of pairs of series resistors, said pairs being connected in parallel between a summing junction at the input of an operational amplifier and a terminal adapted to have a reference voltage applied thereto; a like plurality of diode-transistor switching means each for connecting and disconnecting the junction of a corresponding pair of said series resistors to apparatus ground responsively to a respective digit of said digital signal; and terminal means for receiving a reference signal of selected polarity, said selected polarity being positive or negative, said diode-transistor switching means having a like effect irrespective of said selected polarity, the first resistors of said pairs being connected to said summing junction each have a resistive value weighted according to the numerical code of said digital signal and the second resistors of said pairs of substantially the same value as one another, each of said diode-transistor switching means comprises a three-terminal transistor having its base connected to one pole of a diode, the other pole of said diode being connected to an input terminal adapted to have a respective digit of said digital signal applied thereto, the emitter of said transistor being connected to said junction of the corresponding pair of resistors, and the collector of said transistor being connected to said ground.

6. Apparatus as defined in claim 5 including current means for applying a current to the base of said transistor for driving the latter into conduction in its emitter-collector circuit if said diode is back-biased by said digit of said digital signal.

7. Apparatus as defined in claim 6 wherein said transistor is an npn transistor, said base being connected to the cathode of said diode, and said current means for applying a current comprises a resistor connected in series between said base and a terminal adapted to have a negative voltage applied thereto.

References Cited

UNITED STATES PATENTS

| | | | |
|---|---|---|---|
| 3,184,734 | 5/1965 | Uren et al. | 340—347 |
| 3,210,754 | 10/1965 | Roberts | 340—347 |
| 3,223,994 | 12/1965 | Cates | 340—347 |
| 3,247,507 | 4/1966 | Moses | 340—347 |
| 3,307,173 | 2/1967 | Popodi et al. | 340—347 |
| 3,320,409 | 5/1967 | Larrowe | 340—347 |
| 3,366,947 | 1/1968 | Kawashima et al. | 340—347 |

MAYNARD R. WILBUR, Primary Examiner

G. EDWARDS, Assistant Examiner